United States Patent [19]

Nakamura et al.

[11] 4,118,450
[45] Oct. 3, 1978

[54] METHOD FOR PRODUCING INORGANIC POROUS SHAPED MATERIAL

[75] Inventors: Ryuji Nakamura, Mino; Hideo Motogi, Ibaragi, both of Japan

[73] Assignee: Shikoky Kaken Kogyo Kabushiki Kaisha, Ibaragi, Japan

[21] Appl. No.: 736,233

[22] Filed: Oct. 27, 1976

Related U.S. Application Data

[63] Continuation-in-part of Ser. No. 469,871, May 14, 1974, abandoned.

[51] Int. Cl.$^2$ .............................................. C04B 35/64
[52] U.S. Cl. .................... 264/43; 106/40 V; 264/66
[58] Field of Search ............ 469/871; 264/56, 43, 264/66; 106/40 V, 40 R

[56] References Cited

U.S. PATENT DOCUMENTS

| | | | |
|---|---|---|---|
| 3,396,043 | 8/1968 | Winterburn | 106/40 R |
| 3,717,486 | 2/1973 | Fukimoto et al. | 264/43 |
| 3,867,156 | 2/1975 | Fukumoto et al. | 106/40 V |
| 3,942,990 | 3/1976 | Engstrom et al. | 106/40 R |

*Primary Examiner*—Robert F. White
*Assistant Examiner*—John A. Parrish
*Attorney, Agent, or Firm*—Larson, Taylor and Hinds

[57] ABSTRACT

A method for producing an inorganic porous shaped product comprising the steps of mixing silica dust with water, shaping the mixture, drying the shaped product to adjust the water content thereof to 1 to 10 weight percent and thereafter firing the shaped product at a temperature of 1,000° to 1,450° C, said silica dust being:

(i) a by-product from the process of producing ferro-silicon by electrothermal metallurgy, and
(ii) 0.1 to 1.0 $\mu$ in particle size, 10 to 50 m$^2$/g in specific surface area and about 0.1 to about 0.3 g/cm$^3$ in bulk density, and comprising 85 to 98 weight percent of amorphous silica, 0.2 to 2.0 weight percent of FeO, 0.2 to 5.0 weight percent of Al$_2$O$_3$, 0.5 to 2.0 weight percent of MnO, 0 to 0.1 weight percent of CaO, 0.5 to 5.0 weight percent of MgO and 0.1 to 1.5 weight percent of others.

7 Claims, No Drawings

METHOD FOR PRODUCING INORGANIC POROUS SHAPED MATERIAL

This application is continuation-in-part of our co-pending application Ser. No. 469,871 filed May 14, 1974 now abandoned.

This invention relates to a method for producing an inorganic porous shaped product, more particularly to a method for producing an inorganic porous shaped product from silica dust which is a waste material.

It is well known that electrothermal metallurgical process for preparing ferrosilicon entails the production of a large amount of silica dust as a by-product. The silica dust consists predominantly of amorphous silica and contains small amounts of metal oxides. The silica dust has high heat resistance and high chemical stability because it contains amorphous silica as its main component. However, the silica dust has found no advantageous applications and is therefore discarded at present.

An object of this invention is to find an effective application of silica dust.

Another object of this invention is to produce an inorganic porous shaped product from silica dust.

Another object of this invention is to produce an inorganic porous shaped product having light-weight property, high resistance to fire, excellent heat insulating property and excellent chemical stability and therefore useful as heat insulating materials, refractory bricks, building materials, aggregates, etc.

Other objects and features of this invention will become apparent from the following description.

These objects of this invention can be fulfilled by the steps of mixing silica dust with water, shaping the mixture, drying the shaped product to adjust the water content thereof to 1 to 10 weight percent and thereafter firing the shaped product at 1000° to 1450° C., the starting silica dust being (i) a by-product from the process for producing ferrosilicon by electrothermal metallurgy, and (ii) 0.1 to 1.0μ in particle size, 10 to 50 m$^2$/g in specific surface area and about 0.1 to about 0.3 g/cm$^3$ in bulk density, and comprising 85 to 98 weight percent of amorphous silica, 0.2 to 2.0 weight percent of FeO, 0.2 to 5.0 weight percent of Al$_2$O$_3$, 0.5 to 2.0 weight percent of MnO, 0 to 0.1 weight percent of CaO, 0.5 to 5.0 weight percent of MgO and 0.1 to 1.5 weight percent of others.

Throughout the specification and claims the specific surface area is determined according to BET method using nitrogen gas.

Our research has revealed that foamed products can be prepared from the silica dust obtained as a by-product from the process for producing ferrosilicon by electrothermal metallurgy and having the foregoing composition and properties, by mixing the silica dust with water, shaping the mixture, drying the shaped product to adjust the water content thereof to 1 to 10 weight percent and thereafter firing the shaped product at 1000° to 1450° C. Our research has further indicated that foamed products can not be prepared by using, in place of the specific silica dust of this invention, a mixture of amorphous silica powder and the above-mentioned metal oxides in the specified proportions. This difference is attributable to the fact that the silica dust used in this invention is one obtained as a by-product from the production of ferrosilicon by electrothermal metallurgy techniques, although it is a mixture of amorphous silica and various metal oxides. Thus, the specific silica dust of this invention behaves differently from a mere mixture of amorphous silica and the metal oxides. Although the reason for such different behavior still remains to be fully clarified, it is unquestionably due to the fact that the specific silica dust is one resulting from the production of ferrosilicon by electrothermal metallurgy. In fact, as Comparison Examples 16 to 17 given later show, a foamed product can not be prepared by mixing white carbon or diatomaceous earth, a kind of amorphous silica, with various metal oxides to obtain a mixture having a composition and properties within the ranges specified by this invention and treating the mixture according to this invention. The present invention has been accomplished based on the foregoing novel finding.

The silica dust useful in this invention is one obtained as a by-product from the production of ferrosilicon by electrothermal metallurgy techniques. Such silica dust by-product is usually usable in this invention, since the dust has the composition and properties specified by this invention. However, if the silica dust resulting from the foregoing process should have a composition or properties outside the specified range, the silica dust is not usable in this invention.

To prepare the inorganic porous shaped product of this invention, the above-mentioned silica dust is first mixed with water, whereby the starting material is rendered shapable by the subsequent shaping step. The ratio of the silica dust to water is not particularly limited, provided that the silica dust is made shapable to a desired form. Usually, about 15 to 200 parts by weight of water is mixed with 100 parts by weight of silica dust. The mixture is then shaped to the desired shape such as plate, pillar, granule, etc. by conventional shaping methods.

It is critical in the present invention the shaped product thus prepared be then dried to adjust the water content thereof to 1 to 10 weight percent, preferably 2 to 5 weight percent. If the water content of the shaped product is lower than 1 weight percent, the firing step fails to give the desired porous product or merely results in a very low degree of foaming. Conversely, if the water content exceeds 10 weight percent, the product obtained becomes uneven in porosity and cracking tends to take place in the shaped product during firing. The drying can usually be conducted at elevated temperatures and/or at reduced pressures, though it may be carried out at room temperature.

The shaped product adjusted to the specified water content is fired for foaming at a temperature of 1,000° to 1,450° C. According to the present method, the shaped product can be directly fired at the above-mentioned temperature, or preferably pre-fired at 300° to 900° C. and thereafter fired at 1,000° to 1,450° C. The pre-firing assures more uniform porosity of the product and improves fire resistance of the product obtained. Preferably, the pre-firing is conducted at a temperature of 450° to 700° C. The pre-fired product is subsequently fired at 1,000° to 1,450° C. The preferable firing temperature is 1,050° to 1,400° C., irrespective of whether the pre-firing step precedes the firing step or not. Although foaming mechanism has not been definitely clarified yet, it is thought that the particles of silica dust contained in the shaped product is fused by firing to cover the surface of the shaped product, while the water contained in its interior expands to effect foaming and partially vaporizes off through the covering layer to the atmosphere, thereby forming a kind of honeycomb structure. The shaped product foams to 1.2–5.0 times the original volume by virtue of the firing and maintains this state when cooled. The firing is conducted in various atmospheres such as in air, in nitrogen gas or like inert gas or in vacuum, using an electric furnace, fuel oil furnace, gas furnace or some other suitable furnaces. Firing usually completes within a period of 5 to 30 minutes, although longer time is applicable without any adverse effect. After firing, the product is cooled by suitable methods, for example, by cooling to room temperature slowly or quickly.

The porous material of this invention is covered with a vitreous surface layer having numerous pores to form a kind of honeycomb structure. The pores include closed pores and communicating pores which are present in the surface layer in mingled manner to provide semi-closed pores as a whole, whereas the fine particles of silica dust are fused together to impart high mechanical strength to the shaped material itself.

The properties of the shaped material obtained by the present method vary with the kind of the silica dust used as the starting material and shaping and firing conditions. Usually it has bulk density of 0.3 to 0.8 g/cm$^3$, specific surface area of 0.05 to 0.8 m$^2$/g, hygroscopicity of 30 to 60 weight percent, mechanical strength of 100 to 250 Kg/cm$^2$, fire resistance of 18 to 30 SK and heat insulating property of about 0.07 to 0.2 Kg/m$^2$.hr.° C. It has a nearly white colour.

The firing temperature and pre-firing temperature can be lowered by adding a flux to the starting silica dust. In fact, the firing temperature can be lowered to 900° C. and the pre-firing temperature to 300° to 800° C. when the flux is used. Examples of the flux are glass powder, alkali metal salts, alkaline earth metal salts and boric acid, which are used singly or at least two of which are usable in mixture. Advantageously, glass powder has particle sizes of under 150μ, preferably up to 30μ, more preferably about 1 to 30μ. Preferable glass is silicate glass such as soda-lime glass, borosilicate glass, almino silicate glass and the like having a softening point of about 650° to 900° C., among which soda-lime glass is particularly preferable to use. The amount of glass powder to be used is 10 to 100 parts by weight, preferably 20 to 100 parts by weight, per 100 parts by weight of silica dust. The alkali metal salts and alkaline earth metal salts to be used as a flux include inorganic acid salts thereof. Examples are chlorides, nitrates, carbonates, silicates, sulfates, chromates and aluminates of alkali metals and alkaline earth metals such as lithium, sodium, potassium, strontium, barium, calcium, magnesium, etc. Preferable alkali metal salts and alkaline earth metal salts are carbonates, nitrates, and silicates of sodium, potassium, calcium or magnesium. Specific examples are $Na_2O.nSiO_2$ ($n$:1.0 to 3.9), $NaNO_3$, $Na_2CO_3$, $K_2CO_3$, $K_2O.nSiO_2$, $KNO_3$, $Ca(NO_3)_2$, $Li_2CO_3$, $MgCO_3$, $Mg(NO_3)_2$, $CaCO_3$, $KNaCO_3$, etc., among which especially preferable are $Na_2CO_3$ and $Na_2O.nSiO_2$ ($n$ is the same above). Such alkali metal salt, alkaline earth metal salt or boric acid is used in an amount of 0.5 to 30 parts by weight, preferably 1 to 10 parts by weight, per 100 parts by weight of silica dust.

To improve the fire resistance of the porous material of this invention, an aluminum compound can be added to silica dust. The aluminum compound is used in an amount of 10 to 100 parts by weight, preferably 20 to 80 parts by weight, per 100 parts by weight of silica dust. The addition of aluminum compound improves the fire resistance of the porous material obtained.

Exemplary of such aluminum compound are oxides, salts and hydroxides of aluminum. More specific examples are alumina, alumina sol, alumina gel, alum, aluminum aluminosilicate, aluminum nitrate, aluminum phosphate, aluminum sulfate, aluminum chloride, aluminum hydroxide, etc.

In the present invention, pigment may be added to produce colored porous shaped product. Any of various known pigments is usable for this purpose, preferably in an amount of up to 10 parts by weight per 100 parts by weight of silica dust. If the pigment is used in too excess an amount, insufficient foaming will result during firing.

The inorganic porous material of this invention is lightweight and has high resistance to fire and excellent heat insulating property. It can therefore be used as a refractory or heat resistant insulating material for various furnaces. Because of its outstanding chemical stability, it is also employable in a steel furnace, furnace for special steel, copper refining furnace, coke oven, glass melting furnace and the like which are subject to marked corrosion. In addition, it is advantageous to use as aggregates for cement, building materials, etc.

The method of this invention will be described below in detail with reference to examples and comparison examples in which the parts and percentages are all by weight.

EXAMPLE 1

To 150 parts of silica dust having the following properties and composition and obtained as a by-product from the electrothermal metallurgical process of producing ferrosilicon was added 120 parts of water. The mixture was kneaded and then shaped to the size of 100 mm × 100 mm × 10 mm at an increased pressure of 50 kg/cm$^2$. The properties and composition of the silica dust used were as follows:

| a) Properties | |
|---|---|
| Particle size | 0.1 – 1.0 μ |
| Specific surface area | 30 – 40 m$^2$/g |
| Bulk density | 0.1 – 0.3 g/cm$^3$ |
| b) Composition | |
| $SiO_2$ | 94.8 wt. % |
| $Al_2O_3$ | 0.4 wt. % |
| FeO | 0.5 wt. % |
| CaO | 0.1 wt. % |
| MgO | 1.7 wt. % |
| MnO | 1.9 wt. % |
| $Na_2O$ | 0.2 wt. % |
| $K_2O$ | 0.1 wt. % |
| C | 0.3 wt. % |

The shaped product thus obtained was dried at 105° C. for about 2 hours to adjust its water content to 3 weight percent. The shaped product was then placed in an electric furnace and prefired at 600° C. for about 30 minutes and further heated while increasing the temperature of the furnace to 1,050° C. at a rate of 2.5° C./min, followed by firing at the same temperature for 30 minutes. The fired product was cooled to room temperature to obtain a porous shaped material.

EXAMPLES 2 AND 3

Two kinds of porous shaped materials were prepared in the same manner as in Example 1 except that after completion of pre-firing, the temperatures were elevated at a rate of 2.5° C./min to specified firing temperatures of 1300° C. and 1440° C. respectively.

Comparison Examples 1 and 2

Two kinds of porous shaped materials were prepared in the same manner as in Example 1 except that after completion of pre-firing, the temperatures were elevated at a rate of 2.5° C./min to specified firing temperatures of 980° C. and 1460° C. respectively.

The properties of the shaped materials obtained in Examples 1 to 3 and Comparison Examples 1 to 2 were determined by the following methods. The results are given in Table 1 below.

Bulk density: JIS R-2614
Bending strength: JIS K-6705
Compression strength: JIS K-6705
Impact strength: JIS K-6705

Spalling test:

A test piece of porous shaped material was preheated to 600° C. in an electric furnace and further heated, while the temperature was increased to 1,050° C. at a rate of 2.5° C./min, and heated at the same temperature for 30 minutes. The heated test piece was taken out of the furnace, and a 1-kg steel ball was immediately dropped onto the test piece from 1 meter thereabove. When the test piece was not broken, it was heated again at 1,050° C. for 30 minutes, whereupon the steel ball was dropped onto the test piece again in the same manner as above. The number of repetition of the above-mentioned procedure required to break the test piece was counted.

Resistance to hot water:

A test piece of porous shaped material was immersed in hot water at 80° C. for 3 hours and was inspected with the unaided eyes.

Table 1

| | Example | | | Comparison Example | |
|---|---|---|---|---|---|
| | 1 | 2 | 3 | 1 | 2 |
| Firing temp.(° C) | 1050 | 1300 | 1440 | 980 | 1460 |
| Properties | | | | | |
| Bulk density (g/cm$^3$) | 0.90 | 0.90 | 0.80 | 1.15 | 0.55 |
| Bending strength (kg/cm$^2$) | 70 | 80 | 75 | 70 | 15 |
| Compression strength (kg/cm$^2$) | 180 | 210 | 200 | 150 | 65 |
| Impact strength (kg/cm$^2$) | 2 | 2 | 3 | 0.5 | 0.5 |
| Resistance to hot water | No change | No change | No change | Collapsed | No change |
| Spalling test (times) | 5 | 6 | 7 | 1 | 2 |
| Foaming degree (times) | 1.6 | 1.6 | 1.8 | 1.25 | 2.6 |
| Volume (cm$^3$) | 1600 | 1550 | 1800 | 1250 | 2600 |

EXAMPLES 4 TO 6

Three kinds of porous shaped products were prepared in the same manner as in Examples 1 to 3 except that pre-firing was not conducted. The properties of the products are listed in Table 2.

Comparison Examples 3 and 4

Two kinds of porous shaped products were prepared in the same manner as in Comparison Examples 1 and 2 except that pre-firing was not conducted. The properties of the products obtained are shown in Table 2.

Table 2

| | Example | | | Comp. Example | |
|---|---|---|---|---|---|
| | 4 | 5 | 6 | 3 | 4 |
| Firing temp. (° C) | 1050 | 1300 | 1440 | 980 | 1460 |
| Properties | | | | | |
| Bulk density (g/cm$^3$) | 0.90 | 0.85 | 0.65 | 1.10 | 0.45 |
| Bending strength (kg/cm$^2$) | 60 | 65 | 60 | 50 | 10 |
| Compression strength (kg/cm$^2$) | 150 | 160 | 190 | 120 | 40 |
| Impact strength (kg/cm$^2$) | 2 | 2 | 3 | 2 | 0.2 |
| Spalling test (times) | 5 | 6 | 5 | 1 | 1 |
| Resistance to hot water | no change | no change | no change | Collapsed | no change |
| Foaming degree (times) | 1.6 | 1.7 | 2.2 | 1.3 | 3.4 |
| Volume (cm$^3$) | 1550 | 1700 | 2200 | 1300 | 3400 |

EXAMPLES 7 TO 25

The same silica dust as used in Example 1, sodium carbonate, sodium silicate ($Na_2O:SiO_2 = 1:3$), alumina and sodium silicate glass powder (a mixture of plate glass having a softening point of 750° to 800° C. and bottle glass having a softening point of 700° to 750° C. in equal amounts by weight and pulverized to 80 to 200 mesh) were mixed together in proportions listed in Table 3 below to prepare starting powder compositions. Each of the powder compositions was mixed with a specified amount of water listed in Table 4 and then shaped in the same manner as in Example 1. The water content of the shaped product was adjusted to 2 weight percent by drying at 105° C. for 30 minutes. The shaped product was then subjected to pre-firing and firing steps in the same manner as in Example 1 except that the temperatures shown in Table 4 were applied.

Table 3

| | Starting powder composition (parts) | | | | | | | | |
|---|---|---|---|---|---|---|---|---|---|
| | a | b | c | d | e | f | g | h | i |
| Silica dust | 100 | 100 | 100 | 100 | 100 | 100 | 100 | 100 | 100 |
| $Na_2CO_3$ | 0 | 0 | 0 | 2 | 0 | 0 | 8 | 0 | 0 |
| $Na_2SiO_3$ | 0 | 0 | 0 | 0 | 50 | 4 | 0 | 50 | 20 |
| $Al_2O_3$ | 0 | 20 | 50 | 0 | 50 | 0 | 100 | 8 | 40 |
| Glass powder | 300 | 100 | 0 | 0 | 300 | 0 | 0 | 300 | 0 |

Table 4

| | Example | | | | | |
|---|---|---|---|---|---|---|
| | 7 | 8 | 9 | 10 | 11 | 12 |
| Starting powder composition | a | a | b | c | d | e |
| Amount of water (parts) | 100 | 100 | 50 | 40 | 30 | 150 |
| Pre-firing (° C) | 500 | No pre-firing | 500 | 600 | 500 | 500 |
| Firing (° C) | 900 | 920 | 900 | 1300 | 1200 | 900 |
| Bulk density (g/cm³) | 0.75 | 0.70 | 0.75 | 0.80 | 0.80 | 0.70 |
| Bending strength (kg/cm²) | 70 | 55 | 70 | 85 | 80 | 55 |
| Compression strength (kg/cm²) | 150 | 130 | 200 | 200 | 210 | 140 |
| Impact strength (kg/cm²) | 3 | 2 | 3 | 3 | 1.5 | 3 |
| Spalling test (times) | 6 | 5 | 9 | 12 | 7 | 8 |
| Resistance to hot water | No change | No change | No change | No change | No change | No change |
| Foaming degree (times) | 1.9 | 2.0 | 1.9 | 1.8 | 1.8 | 2.0 |
| Volume (cm³) | 1950 | 2050 | 1900 | 1800 | 1800 | 2100 |

| | Example | | | | |
|---|---|---|---|---|---|
| | 13 | 14 | 15 | 16 | 17 |
| Starting powder composition | f | g | h | i | a |
| Amount of water (parts) | 100 | 100 | 150 | 40 | 100 |
| Pre-firing (° C) | 600 | 650 | 500 | 600 | 550 |
| Firing (° C) | 1300 | 1200 | 900 | 1300 | 910 |
| Bulk density (g/cm³) | 0.70 | 0.65 | 0.60 | 0.75 | 0.80 |
| Bending strength (kg/cm²) | 74 | 65 | 70 | 70 | 60 |
| Compression strength (kg/cm²) | 200 | 190 | 130 | 180 | 180 |
| Impact strength (kg/cm²) | 3 | 2 | 3 | 3 | 2 |
| Spalling test (times) | 5 | 13 | 5 | 9 | 5 |
| Resistance to hot water | No change | No change | No change | No change | No change |
| Foaming degree (times) | 2.0 | 2.2 | 2.4 | 1.9 | 1.8 |
| Volume (cm³) | 2050 | 2250 | 2400 | 1900 | 1800 |

| | Example | | | | |
|---|---|---|---|---|---|
| | 18 | 19 | 20 | 21 | 22 |
| Starting powder composition | a | a | a | c | c |
| Amount of water (parts) | 100 | 100 | 100 | 40 | 40 |
| Pre-firing (° C) | 550 | 550 | 550 | No pre-firing | No pre-firing |
| Firing (° C) | 980 | 1200 | 1340 | 1020 | 1200 |
| Bulk density (g/cm³) | 0.80 | 0.70 | 0.65 | 0.90 | 0.80 |
| Bending strength (kg/cm²) | 65 | 80 | 75 | 60 | 65 |
| Compression strength (kg/cm²) | 170 | 190 | 180 | 220 | 180 |
| Impact strength (kg/cm²) | 3 | 2.5 | 2.5 | 3 | 2.5 |
| Spalling test (times) | 6 | 6 | 7 | 9 | 10 |
| Resistance to hot water | No change | No change | No change | No change | No change |
| Foaming degree (times) | 1.8 | 2.0 | 2.2 | 1.6 | 1.8 |
| Volume (cm³) | 1750 | 1950 | 2250 | 1600 | 1800 |

| | Example | | |
|---|---|---|---|
| | 23 | 24 | 25 |
| Starting powder composition | c | c | c |
| Amount of water (parts) | 40 | 40 | 40 |
| Pre-firing (° C) | No pre-firing | 600 | 600 |
| Firing (° C) | 1340 | 1360 | 1450 |
| Bulk density (g/cm³) | 0.80 | 0.75 | 0.65 |
| Bending strength (kg/cm²) | 65 | 70 | 65 |
| Compression strength (kg/cm²) | 170 | 180 | 200 |
| Impact strength (kg/cm²) | 2.5 | 3 | 2 |
| Spalling test (times) | 10 | 13 | 10 |
| Resistance to hot water | No change | No change | No change |
| Foaming degree (times) | 1.8 | 1.9 | 2.2 |
| Volume (cm³) | 1750 | 1950 | 2250 |

Comparison Examples 5 to 9

Each of the starting powder compositions listed in Table 3 was mixed with a specified amount of water listed in Table 5 and then shaped in the same manner as in Example 1. The water content of the shaped product was adjusted to 3 weight percent by drying. The shaped product was then subjected to pre-firing and firing steps in the same manner as in Example 1 except that the temperatures shown in Table 5 were applied.

Table 5

|  | Comparison Example | | | | |
|---|---|---|---|---|---|
|  | 5 | 6 | 7 | 8 | 9 |
| Starting powder composition | a | a | c | c | c |
| Amount of water (parts) | 100 | 100 | 40 | 40 | 40 |
| Pre-firing (° C) | 550 | 550 | No pre-firing | 600 | 600 |
| Firing (° C) | 870 | 1460 | 980 | 980 | 980 |
| Bulk density (g/cm$^3$) | 1.05 | 0.50 | 1.10 | 1.15 | 0.35 |
| Bending strength (kg/cm$^2$) | 5 | 15 | 10 | 10 | 20 |
| Compression strength (kg/cm$^2$) | 20 | 50 | 40 | 30 | 70 |
| Impact strength (kg/cm$^2$) | 1 | 1 | 0.5 | 0.5 | 0.2 |
| Spalling test (times) | 1 | 2 | 1 | 2 | 2 |
| Resistance to hot water | No change | No change | No change | No change | No change |
| Foaming degree (times) | 1.4 | 2.9 | 1.3 | 1.2 | 4.1 |
| Volume (cm$^3$) | 1350 | 2850 | 1350 | 1200 | 4150 |

EXAMPLE 26

300 parts of the same silica dust as used in Example 1 was mixed with 300 parts of water, and the resulting mixture was shaped to a granular form having a diameter of about 1700 to 300μ. The water content of the granule was then adjusted to 3 weight percent by drying at 105° C. for 30 minutes. The granule was pre-fired at 600° C. for about 10 minutes in an electric furnace and then heated to 1300° C. over a period of 3.0 hours, followed by firing at the same temperature for 30 minutes. The properties of the resulting foamed granule were determined by the following methods. The results are given in Table 8 below.

| Bulk density (g/cm$^3$): | JIS-R-2614 |
|---|---|
| Granule size (μ): | Measured by a sieve |
| Compression strength: (kg/cm$^2$) | JIS-K-6705 |

Table 6

| Bulk density (g/cm$^3$) | : | 0.35 to 0.40 |
|---|---|---|
| Granule size (μ) | : | 3300 to 5700 |
| Compression strength (kg/cm$^2$) | : | 3 |
| Melting point (° C) | : | 1620 |

EXAMPLES 27 TO 37

The same silica dust as used in Example 1, magnesium carbonate, sodium silicate (Na$_2$O:SiO$_2$ = 2.3:1), glass powder having a particle size of about 5 to 30μ and aluminum hydroxide were mixed together in proportions listed in Table 7 below to prepare starting powder compositions. Each of the starting powder compositions was mixed with a specified amount of water listed in Table 8 and then shaped to a granular form in the same manner as in Example 29. The water content of the granule was adjusted to 2.0 weight percent. The granule was then subjected to pre-firing and firing steps in the same manner as in Example 1 except that the temperatures shown in Table 8 were applied.

Table 7

| Starting powder composition (weight parts) | | | | | | |
|---|---|---|---|---|---|---|
|  | j | k | l | m | n | o |
| Silica dust | 100 | 100 | 100 | 100 | 100 | 100 |
| Magnesium carbonate | 0 | 0 | 6 | 0 | 4 | 0 |
| Sodium silicate | 0 | 0 | 0 | 20 | 0 | 20 |
| Aluminum hydroxide | 0 | 50 | 0 | 20 | 20 | 0 |
| Glass powder | 100 | 0 | 0 | 0 | 20 | 0 |

Table 8

|  | Example | | | | |
|---|---|---|---|---|---|
|  | 26 | 27 | 28 | 29 | 30 |
| Starting powder composition | j | j | l | k | m |
| Amount of water (parts) | 50 | 50 | 94 | 150 | 60 |
| Pre-firing (° C) | 600 | 600 | 600 | 600 | No pre-firing |
| Firing (° C) | 910 | 1320 | 1020 | 1300 | 910 |
| Bulk density (g/cm$^3$) | 0.40 – 0.45 | 0.30 – 0.35 | 0.25 – 0.30 | 0.30 – 0.35 | 0.40 – 0.45 |
| Granule size (μ) | 3300 – 5700 | 3300 – 5700 | 3300 – 5700 | 3300 – 5700 | 3300 – 4700 |
| Compression strength (kg/cm$^2$) | 4 | 3 | 3 | 3 | 4 |
| Melting point (° C) | 1550 | 1650 | 1550 | 1600 | 1560 |
| Foaming degree (times) | 2.6 – 3.0 | 3.4 – 4.0 | 4.0 – 4.8 | 3.4 – 4.0 | 2.6 – 3.0 |

|  | Example | | | | | |
|---|---|---|---|---|---|---|
|  | 31 | 32 | 33 | 34 | 35 | 36 |
| Starting powder composition | m | m | m | m | m | o |
| Amount of water (parts) | 60 | 60 | 60 | 60 | 60 | 60 |
| Pre-firing (° C) | No pre-firing | 600 | No pre-firing | No pre-firing | No pre-firing | No pre-firing |
| Firing (° C) | 1000 | 1300 | 1300 | 1340 | 1200 | 1300 |

Table 8-continued

| | | | | | | |
|---|---|---|---|---|---|---|
| Bulk density (g/cm³) | 0.30 – 0.35 | 0.30 – 0.35 | 0.30 – 0.35 | 0.30 – 0.35 | 0.30 – 0.35 | 0.25 – 0.30 |
| Granule size (μ) | 3300 – 5700 | 3300 – 5700 | 3300 – 5700 | 3300 – 5700 | 3300 – 5700 | 3300 – 5700 |
| Compression strength (kg/cm²) | 4 | 4 | 3 | 3 | 3 | 4 |
| Melting point (° C) | 1600 | 1550 | 1520 | 1600 | 1580 | 1550 |
| Foaming degree (times) | 3.4 – 4.0 | 3.4 – 4.0 | 3.4 – 4.0 | 3.4 – 4.0 | 3.4 – 4.0 | 4.0 – 4.8 |

Comparison Examples 10 to 15

Each of the starting powder compositions listed in Table 7 was mixed with a specified amount of water listed in Table 9 and then shaped to a granular form in the same manner as in Example 29. The water content of the granule was adjusted to 2.5 weight percent. The granule was then subjected to pre-firing and firing steps in the same manner as in Example 1 except that the temperatures shown in Table 9 were applied.

Table 9

| | Comparison Example | | | | | |
|---|---|---|---|---|---|---|
| | 10 | 11 | 12 | 13 | 14 | 15 |
| Starting powder | j | j | l | l | m | m |
| Amount of water (parts) | 50 | 50 | 94 | 94 | 60 | 60 |
| Pre-firing (° C) | 600 | 600 | 600 | 600 | No pre-firing | No pre-firing |
| Firing (° C) | 850 | 1370 | 980 | 1460 | 850 | 1370 |
| Bulk density (g/cm³) | 0.9 – 1.0 | 0.1 – 0.2 | 0.8 – 0.9 | 0.1 – 0.2 | 0.8 – 0.9 | 0.1 – 0.2 |
| Granule size (μ) | 1650 – 3300 | 3300 – 5700 | 1650 – 3300 | 1650 – 4000 | 1650 – 3300 | 1650 – 5700 |
| Compression strength (kg/cm²) | 1.5 | 0.5 | 2 | 0.5 | 0.5 | 0.5 |
| Melting point (° C) | 1250 | 1450 | 1290 | 1400 | 1300 | 1250 |
| Foaming degree (times) | 1.2 – 1.3 | 6 – 8 | 1.3 – 1.5 | 6 – 8 | 1.3 – 1.5 | 5 – 7 |

Comparison Example 16

Two kinds of shaped products were prepared in the same manner as in Example 4 except that each of white carbon ("TOKUSIL", trade mark, product of Tokuyama Soda Co. Ltd., Japan) and the following mixture shown in Table 11 is used in place of the silica dust used in Example 4. The shaped products fail to give a foamed product.

Listed in Table 10 are composition of the white carbon and properties thereof, and in Table 11 is the composition of the above mixture.

Table 10

| Composition of white carbon | (% by weight) |
|---|---|
| SiO₂ (amorphous) | 98 – 99 |
| FeO | 0 |
| Al₂O₃ | 0 – 1 |
| MnO | 0 |
| CaO | 0 – 1 |
| MgO | 0 |
| Others | 0 – 1 |
| Properties of white carbon | |
| Particle size | 10 – 50 μ |
| Specific surface area | 50 – 250 m²/g |

Table 11

| Composition of the above mixture | (% by weight) |
|---|---|
| White carbon | 94.8 |
| FeO | 0.5 |
| Al₂O₃ | 0.4 |
| MnO | 1.9 |
| CaO | 0.1 |
| MgO | 1.7 |
| Others | 0.5 |

Comparison Example 17

Two kinds of shaped products were prepared in the same manner as in Example 4 except that each of diatomaceous earth and the following mixture shown in Table 13 is used in place of the silica dust used in Example 4. The shaped products fail to give a foamed product.

The composition of the diatomaceous earth and properties thereof are shown in Table 12 below and the composition of the above mixture is shown in Table 13.

Table 12

| Composition of diatomaceous earth | (% by weight) |
|---|---|
| SiO₂ (amorphous) | 89 |
| FeO | 1.7 |
| Al₂O₃ | 5.2 |
| MnO | 0.3 |
| CaO | 0.2 |
| MgO | 0.4 |

What is claimed is:

1. A method for producing an inorganic porous shaped product comprising the steps of mixing silica dust with water, shaping the mixture, drying the shaped product to adjust the water content thereof to 1 to 10 weight percent and thereafter firing the shaped product at a temperature of 1000° to 1450° C., said silica dust being:

(i) a by-product from the process of producing ferro-silicon by electrothermal metallurgy, and
    (ii) 0.1 to 1.0μ in particle size, 10 to 50 m²/g in specific surface area and about 0.1 to about 0.3 g/cm³ in bulk density, and comprising 85 to 98 weight percent of amorphous silica, 0.2 to 2.0 weight percent of FeO, 0.2 to 5.0 weight percent of Al₂O₃, 0.5 to 2.0 weight percent of MnO, 0 to 0.1 weight percent of CaO, 0.5 to 5.0 weight percent of MgO and 0.1 to 1.5 weight percent of others.

2. The method for producing an inorganic porous shaped product according to claim 1, in which said water content of the shaped product is adjusted to 2 to 5 weight percent by drying.

3. The method for producing an inorganic porous shaped product according to claim 1, in which said silica dust is mixed with the water in combination with 0.5 to 100 weight percent of a flux, based on the silica dust.

4. The method for producing an inorganic porous shaped product according to claim 3 in which said flux is at least one species selected from the group consisting of glass powder, alkali metal salt, alkaline earth metal salt and boric acid.

5. The method for producing an inorganic porous shaped product according to claim 1, in which said firing step is conducted at a temperature of 1050° to 1400° C.

6. A method for producing an inorganic porous shaped product comprising the steps of mixing silica dust with water, shaping the mixture, drying the shaped product to adjust the water content thereof to 1 to 10 weight percent, pre-firing the shaped product at a temperature of 300° to 900° C. and thereafter firing the prefired product at a temperature of 1000° to 1450° C., said silica dust being
  (i) a by-product from the process of producing ferrosilicon by electrothermal metallurgy, and
  (ii) 0.1 to 1.0μ in particle size, 10 to 50 m²/g in specific surface area and about 0.1 to about 0.3 g/cm³ in bulk density, and comprising 85 to 98 weight percent of amorphous silica, 0.2 to 2.0 weight percent of FeO, 0.2 to 5.0 weight percent of Al$_2$O$_3$, 0.5 to 2.0 weight percent of MnO, 0 to 0.1 weight percent of CaO, 0.5 to 5.0 weight percent of MgO and 0.1 to 1.5 weight percent of others.

7. The method for producing an inorganic porous shaped product according to claim 6, in which said prefiring step is conducted at a temperature of 450° to 700° C.

* * * * *